July 8, 1924. 1,500,645
M. C. SCHWEINERT ET AL
QUICK ACTING PUMP COUPLING
Filed May 20, 1921
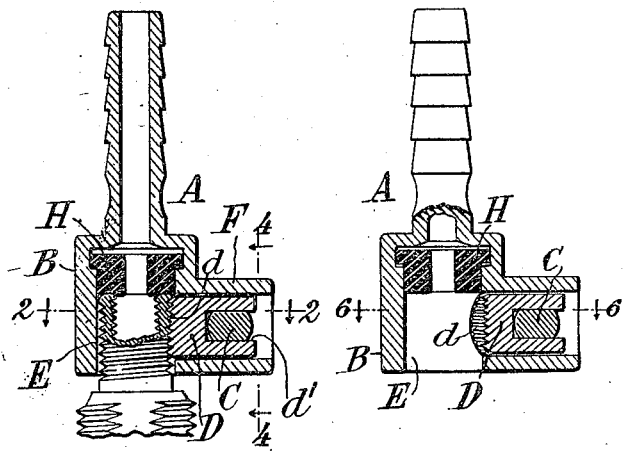
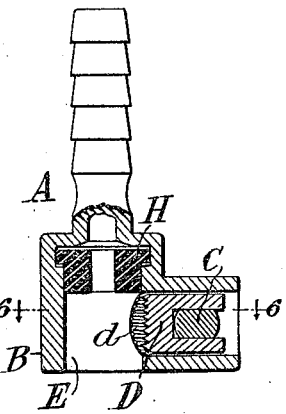
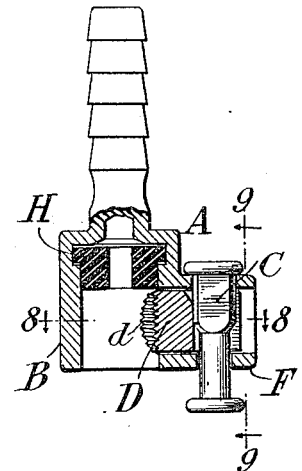
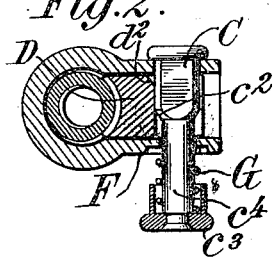
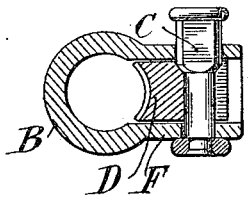
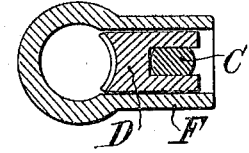
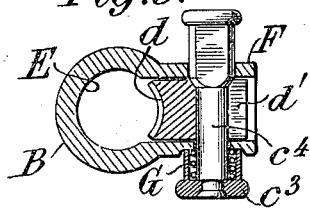
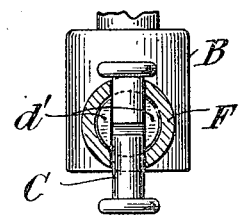
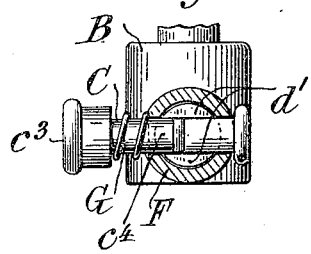
Inventors
Maximilian Charles Schweinert
and Henry Phillip Kraft,
By Attorneys, Patented July 8, 1924.

1,500,645

UNITED STATES PATENT OFFICE.

MAXIMILIAN CHARLES SCHWEINERT, OF NEW YORK, N. Y., AND HENRY PHILLIP KRAFT, OF RIDGEWOOD, NEW JERSEY.

QUICK-ACTING PUMP COUPLING.

Application filed May 20, 1921. Serial No. 471,242.

*To all whom it may concern:*

Be it known that we, MAXIMILIAN CHARLES SCHWEINERT and HENRY PHILLIP KRAFT, both citizens of the United States of America, residing in the city, county, and State of New York, and Ridgewood, in the county of Bergen and State of New Jersey, respectively, have invented certain new and useful Improvements in a Quick-Acting Pump Coupling, of which the following is a specification.

The present invention relates to pump couplings, and aims to provide certain improvements therein.

The present invention is particularly directed to that type of pump coupling employed in conjunction with hand or power operated pumps, whereby a quick attachment and detachment of said coupling with a tire valve or the like may be made, and one wherein, notwithstanding its simple construction, provides a very satisfactory union between the coupled parts.

According to the present invention, we provide a coupling member having an enlarged end adapted to fit over a valve nipple or other threaded member. A section of this end is preferably cut away to form a recess in which a dog or catch member is adapted to move and be projected into the bore of the coupling. The dog or catch member is preferably formed on its end face with screw threads adapted to engage the threads on the member to which it is to be coupled. To move the dog into engaging position within the bore of the coupling, there is provided a plunger having a cam surface for engagement with the dog. The plunger is preferably supported by the body of the coupling which is formed with a lateral extension, which also serves to house the dog or catch member. The plunger may be arranged to move at any desired angle with respect to the coupling body, and as illustrated in the several embodiments of the invention is shown as arranged parallel with, and transverse to, the axis of the coupling.

According to the preferred embodiment of the invention, we propose employing a spring pressed plunger which will always hold the dog in engaging position within the bore of the coupling, so that when it is sought to apply the coupling to a valve nipple, a slight pressure of the operator's finger acting against the spring means will permit the coupling to be slipped over the valve nipple, whereupon releasing the finger pressure, the coupling action will be completed.

The invention also includes other features of improvement which will be hereinafter more fully set forth.

Referring to the drawing, which shows several embodiments of our invention,—

Figure 1 is a longitudinal section of the pump coupling on a valve nipple;

Fig. 2 is a transverse section of Fig. 1 taken on the line 2—2;

Fig. 3 is a similar view showing the dog in its retracted position;

Fig. 4 is a section of Fig. 1 taken on the line 4—4.

Fig. 5 is a longitudinal section of a modification, showing the dog in its retracted position;

Fig. 6 is a transverse section of Fig. 5 taken on the line 6—6;

Fig. 7 is a view similar to Fig. 5, showing another modification;

Fig. 8 is a transverse section of Fig. 7 taken on the line 8—8;

Fig. 9 is a section of Fig. 7 taken on the line 9—9.

Referring to the embodiment of the invention shown in Figs. 1-4, let A indicate the coupling as a whole, which consists of a body portion B, provided with the usual ridged shank for engagement with a hose, and a spring operated plunger C for moving a dog or catch member D into engagement with a threaded member, herein shown as a valve nipple. The end of the body portion B is formed with a bore E which is preferably unthreaded so as to slip easily over the valve nipple. Said body portion is also preferably formed with a recessed lateral extension F, which is adapted to house the dog D and permit its being projected into the bore E to engage the valve nipple. The dog D as contemplated by the present invention consists of a cylindrical member, having one of its ends concaved and formed with screw threads as at $d$ and its opposite end slotted or bifurcated as indicated at $d'$ to accommodate the plunger C. It is to be understood, however, that the dog may be of any desired configuration. The plunger and dog are preferably formed with coacting beveled or cam surfaces designated as $c^2$ and $d^2$, respectively, which function to move the dog inwardly into engaging position when the plunger is urged inwardly by the tension of the spring G. The spring G is positioned between an enlarged head $c^3$ on the plunger and a recess formed on the outer surface of the lateral extension F, and normally acts to maintain the dog in its engaging position. An enlarged end on the opposite end of the plunger limits its inward movement, and also acts to prevent the separation of the assembled parts. To permit the retraction of the dog to its disengaging position, a section of the plunger beyond the cam surface is formed with a reduced diameter as indicated at $c^4$, and when it is sought to apply the coupling to a valve nipple, the pressure of the operator's finger acting against the spring pressed plunger suffices to move the plunger to an outward position as shown in Fig. 3, and the coupling may then be pushed over the valve nipple. In accomplishing this, the dog is forced into its retracted position against the reduced portion of the plunger upon engaging the end of the valve nipple. Upon releasing the finger pressure, the dog is actuated by the spring into its engaging position, resulting in the production of a very secure union of the parts.

As shown in Figs. 1–4, the plunger is arranged to move at right angles to the longitudinal axis of the coupling, but it is obvious that said arrangement may be varied, so that the plunger may move at any desired angle.

In Figs. 5 and 6 we have shown an embodiment of the invention similar to that disclosed in Figs. 1–4, excepting that the spring means G has been omitted. By omitting the spring means it becomes obvious that the plunger must be manually operated to move the dog into engaging position.

In Figs. 7–9 we have shown still another embodiment of the invention. In principle, this embodiment is identical with that illustrated in Figs. 5 and 6, and merely differs therefrom in that, instead of the plunger being arranged to move in a direction at right angles to the axis of the coupling, it is designed to move parallel thereto.

In the various embodiments of the invention, it is desirable that the coupling be provided with suitable means for making a leak-tight joint with the valve nipple, and according to the present invention a gasket of the piston type is employed for this purpose. The gaskets H are of this type. To promote the piston action of these gaskets, the wall of the coupling adjacent the inner end of the shank is cut away at at I, so as to admit pressure to the back of the gasket. This pressure acts to move the piston gasket downwardly into contact with the end of the valve nipple as indicated in Fig. 1.

In applying the pump couplings of the present invention to a valve nipple, the plunger C is first positioned to permit the dog being moved into its disengaging position as shown in Figs. 3 and 6, and the coupling pushed down over the valve nipple. This downward movement will move the dog out of the bore if it happens to be projecting therein. The plunger is then moved into the position shown in Figs. 7 and 9, or permitted to move into the position shown in Figs. 2 and 4 due to the action of the spring, and a very satisfactory connection between the coupling and the valve stem is obtained. To disengage the coupling, the plunger is moved in the reverse direction and the coupling may then be lifted off from the valve nipple.

Although we have shown and described several embodiments of our invention, it will be understood that various modifications may be resorted to without departing from the spirit of the invention. Thus, it is within the province of the present invention to reverse the arrangement of the screw threaded engaging means on the coupling, so that instead of having the bore of the coupling unthreaded and the engaging face of the dog threaded, the bore of the coupling may be threaded and the engaging face of the dog unthreaded; also both the coupling bore and dog may be formed with or without screw threads as desired.

It will be also understood that the inventive idea herein disclosed is susceptible of use in other connections, such as, with quick detachable dust caps, rim-nuts, etc., and we, therefore, do not desire to have its applicability limited to pump couplings.

What we claim is:

1. A pump coupling or the like, having a recessed body portion, a movable dog slidable but not rotatable in said recess, adapted to engage a threaded member to hold the coupling thereon, and a spring-pressed actuating member movable relatively to the dog normally maintaining said dog in engaging position.

2. A pump coupling or the like, having a recessed body portion, a movable dog slidable but not rotatable in said recess adapted to engage a threaded member to hold the coupling thereon, and a spring-pressed actuating member normally maintaining said dog in engaging position, the movable dog and the actuating member being formed with coacting cam faces.

3. A pump coupling or the like, comprising an enlarged body portion formed with an unthreaded bore adapted to fit over a valve nipple or the like, a movable dog adapted to be projected into said bore, and a slidable plunger movable relatively to the dog for actuating said dog, said dog and plunger being housed in a lateral extension or offset on said body portion.

4. A pump coupling or the like, comprising an enlarged body portion formed with an unthreaded bore adapted to fit over a valve nipple or the like, a movable dog adapted to be projected into said bore, and a slidable plunger for actuating said dog, said dog and plunger being housed in a lateral extension or offset on said body portion, and movable at right angles to each other.

5. A pump coupling or the like, having an enlarged body portion formed with a recessed lateral extension or offset, a movable dog in said recess adapted to engage a threaded member to hold the coupling thereon, and a spring-pressed plunger acting to normally hold the dog in engaging position, the dog and plunger being movable relatively to one another.

6. A pump coupling or the like, having an enlarged body portion formed with a recessed lateral extension or offset, a movable dog in said recess adapted to engage a threaded member to hold the coupling thereon, and a spring-pressed plunger acting to normally hold the dog in engaging position, the spring being arranged between one end of the plunger and the exterior of the extension.

In witness whereof, we have hereunto signed our names.

MAXIMILIAN CHARLES SCHWEINERT.
HENRY PRILLIP KRAFT.